(12) United States Patent
Ju et al.

(10) Patent No.: US 10,153,490 B2
(45) Date of Patent: Dec. 11, 2018

(54) COMPOSITE TRANSITION METAL OXIDE-BASED PRECURSOR, PREPARING METHOD THEREOF, AND CATHODE ACTIVE MATERIAL USING THE SAME

(71) Applicant: LG CHEM, LTD., Seoul (KR)

(72) Inventors: Seo Hee Ju, Seoul (KR); Kwon Young Choi, Seoul (KR); Sung Ho Ban, Hwaseong-si (KR); Jun Ho Eom, Seongnam-si (KR)

(73) Assignee: LG Chem, Ltd. (KR)

( * ) Notice: Subject to any disclaimer, the term of this patent is extended or adjusted under 35 U.S.C. 154(b) by 26 days.

(21) Appl. No.: 15/356,946

(22) Filed: Nov. 21, 2016

(65) Prior Publication Data

US 2017/0317349 A1    Nov. 2, 2017

(30) Foreign Application Priority Data

Apr. 29, 2016   (KR) .................. 10-2016-0053481

(51) Int. Cl.
*H01M 4/02* (2006.01)
*C01G 53/00* (2006.01)
*H01M 4/525* (2010.01)

(52) U.S. Cl.
CPC ............ *H01M 4/525* (2013.01); *C01G 53/50* (2013.01); *C01P 2002/88* (2013.01); *C01P 2004/50* (2013.01); *C01P 2004/51* (2013.01); *C01P 2004/53* (2013.01); *C01P 2004/61* (2013.01); *C01P 2004/62* (2013.01); *C01P 2004/64* (2013.01); *C01P 2006/11* (2013.01); *C01P 2006/12* (2013.01); *C01P 2006/14* (2013.01); *C01P 2006/16* (2013.01); *C01P 2006/40* (2013.01); *H01M 2004/028* (2013.01)

(58) Field of Classification Search
CPC ................................. C01G 53/44; C01G 53/04
See application file for complete search history.

(56) References Cited

U.S. PATENT DOCUMENTS

2009/0302267 A1   12/2009   Albrecht et al.
2013/0045421 A1    2/2013   Kobino et al.

FOREIGN PATENT DOCUMENTS

| AU | 2011290195 A1 | 2/2013 |
| JP | 2013206679 A | 10/2013 |
| JP | 5716001 B2 | 5/2015 |
| KR | 20120098631 A | 9/2012 |
| KR | 20150065046 A | 6/2015 |
| WO | 2012020768 A1 | 2/2012 |

*Primary Examiner* — Peter F Godenschwager
(74) *Attorney, Agent, or Firm* — Lerner, David, Littenberg, Krumholz & Mentlik, LLP

(57) ABSTRACT

The present disclosure provides a novel composite transition metal oxide-based precursor, a preparing method thereof, and a cathode active material for a secondary battery prepared from the precursor. In the present disclosure, it is possible to enhance productivity and economic efficiency due to a high reaction yield during the synthesis of a cathode active material and to enhance the initial discharge capacity and lifespan characteristics of a secondary battery including a cathode active material by using an oxide-based precursor having a high oxygen fraction instead of a hydroxide-based precursor used as a precursor of a cathode active material in the related art.

11 Claims, 4 Drawing Sheets

COMPOSITE TRANSITION METAL OXIDE-BASED PRECURSOR, PREPARING METHOD THEREOF, AND CATHODE ACTIVE MATERIAL USING THE SAME

CROSS-REFERENCE TO RELATED APPLICATIONS

This application claims benefit and priority to Korean Patent Application No. 10-2016-0053481, filed on Apr. 29, 2016, with the Korean Intellectual Property Office, the disclosure of which is incorporated herein in its entirety by reference.

TECHNICAL FIELD

The present disclosure relates to a novel composite transition metal oxide-based precursor which may improve productivity and economic efficiency due to a high reaction yield when a cathode active material is synthesized, a preparing method thereof, and a cathode active material for a secondary battery using the same.

BACKGROUND

Recently, as electronic devices have become smaller, there is a need for a high-capacity secondary battery, and particularly, lithium secondary batteries having higher energy densities than nickel•cadmium batteries and nickel•hydrogen batteries have drawn attention.

As a cathode active material of the lithium secondary battery, a lithium-containing cobalt oxide ($LiCoO_2$) has been mainly used, and in addition to the material, lithium-containing manganese oxides such as $LiMnO_2$ having a layered crystal structure and $LiMn_2O_4$ having a spinel crystal structure and a lithium-containing nickel oxide $LiNiO_2$ have also been used.

Meanwhile, the above-described lithium composite transition metal oxide-based cathode active materials are generally prepared by a solid phase synthesis method by synthesizing a composite transition metal hydroxide-based precursor ($M(OH)_2$) and using the synthesized hydroxide-based precursor and a lithium precursor (LiOH, $Li_2CO_3$). However, when a cathode active material is prepared using the hydroxide-based precursor, problems such as deterioration in productivity and economic efficiency occur because the production yield is as low as approximately 70%. In addition, hydroxide-based precursors are metastable in the air. Particularly in a Ni-rich system having a high Ni content, a surface reaction locally occurs due to the high reactivity of Ni with moisture, so that it is difficult to store and handle a hydroxide precursor in the air, and for the local surface reaction, it is difficult to optimize the molar ratio in the reaction with lithium, so that a synthesized cathode active material lacks capacity and lifespan characteristics.

Therefore, there is an urgent need for developing a cathode active material having a novel configuration, which is easily stored and may enhance the electrochemical properties of a lithium secondary battery while enhancing the reaction yield to improve the productivity and economic efficiency.

SUMMARY

The present disclosure has been made based on the conception that it is possible to not only enhance productivity due to a high reaction yield during the synthesis of a cathode active material, to but also easily synthesize the cathode active material due to a high oxygen fraction in a composite transition metal oxide when using an oxide-based composite transition metal precursor prepared by a process of performing a heat treatment on a hydroxide-based composite transition metal precursor in the related art under the oxygen atmosphere and/or oxidizing the hydroxide-based composite transition metal precursor using an oxidizing agent, instead of using the hydroxide-based composite transition metal precursor as it is.

Thus, the present disclosure has been made in an effort to provide the above-described composite transition metal oxide-based precursor and a preparing method thereof.

The present disclosure has also been made in an effort to provide a cathode active material which is prepared from the composite transition metal oxide-based precursor and a lithium precursor, and thus may enhance the initial discharge capacity and lifespan characteristics of a battery.

In order to achieve the aforementioned object, the present disclosure provides a composite transition metal oxide-based precursor represented by the following Chemical Formula 1.

  [Chemical Formula 1]

$Ni_aCo_bM'_cO_x$ (1<x≤1.5)

In the formula,

M' is one or more selected from the group consisting of an alkali metal, an alkaline earth metal, a Group XIII element, a Group XIV element, a Group XV element, a Group XVI element, a Group XVII element, a transition metal, and a rare earth element, and 0.6≤a<1.0, 0≤b≤0.4, 0≤c≤0.4, a+b+c=1.

Here, it is preferred that M' is one or more selected from the group consisting of Al, Mn, Zr, W, Ti, Mg, Sr, Ba, Ce, Hf, F, P, S, La, and Y.

In the present disclosure, the precursor may be a primary particle or a secondary particle in which a plurality of primary particles is aggregated. Here, the primary particle has a flake-like or needle-like shape with an average particle diameter in a range of 0.01 to 0.8 μm, and a plurality of pore structures may be present on the surface or inside thereof. Further, the secondary particle may have an average particle diameter (D50) in a range of 3 to 30 μm. Here, in an X-ray diffraction analysis, a lattice constant of the precursor has a value of a=b=c.

In the present disclosure, the precursor has a specific surface area in a range of 5 to 80 $m^2/g$ measured according to the nitrogen adsorption BET method, and preferably, the specific surface area may be 5 to 50 $m^2/g$. In addition, in the precursor, a volume of pores in a range of 5 nm to 50 nm may be in a range of $10^{-3}$ to $10^{-2}$ $cm^3/g \cdot nm$ per weight of particles.

In the present disclosure, the precursor powder may have a tap density of 2.0 g/cc or more, and preferably 2.1 g/cc or more.

The present disclosure provides a cathode active material prepared by including the above-described composite transition metal oxide-based precursor and a lithium precursor. Here, it is preferred that the cathode active material is a high-Ni-based cathode active material having a nickel content of 60% or more in the overall transition metals.

The present disclosure provides a method for preparing the above-described composite transition metal oxide-based precursor represented by Chemical Formula 1.

More specifically, the preparing method may comprise a step of oxidizing a composite transition metal hydroxide-based precursor represented by the following Chemical Formula 2.

$$Ni_aCo_bM'_c(OH)_2 \quad \text{[Chemical Formula 2]}$$

In the formula,

M' is one or more selected from the group consisting of an alkali metal, an alkaline earth metal, a Group XIII element, a Group XIV element, a Group XV element, a Group XVI element, a Group XVII element, a transition metal, and a rare earth element, and 0.6≤a<1.0, 0≤b≤0.4, 0≤c≤0.4, a+b+c=1.

In the present disclosure, it is preferred that in the oxidizing, (i) a heat treatment is performed under an oxygen atmosphere, (ii) an oxidizing agent is used, or (iii) both (i) and (ii) are applied.

According to a preferred embodiment of the present disclosure, in the oxidizing, a heat treatment may be performed in a range of 200 to 1,000° C. under an oxygen atmosphere at an oxygen concentration of 80% or more for 1 to 12 hours.

According to a preferred embodiment of the present disclosure, as the oxidizing agent, it is possible to use one or more selected from the group consisting of $KMnO_4$, $H_2O_2$, $Na_2O_2$, $FeCl_3$, $CuSO_4$, $CuO$, $PbO_2$, $MnO_2$, $HNO_3$, $KNO_3$, $K_2Cr_2O_7$, $CrO_3$, $P_2O_5$, $H_2SO_4$, $K_2S_2O_8$, a halogen, and $C_6H_5NO_2$.

In the present disclosure, it is possible to enhance productivity and economic efficiency due to a high reaction yield during the synthesis of a cathode active material by using an oxide-based precursor having a high oxygen fraction instead of a hydroxide-based precursor used as a precursor of a cathode active material in the related art, and particularly, to easily prepare a high-Ni-based cathode active material.

As a secondary battery includes a cathode active material prepared from the oxide-based precursor, the initial discharge capacity and lifespan characteristics of the secondary battery may be significantly enhanced.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
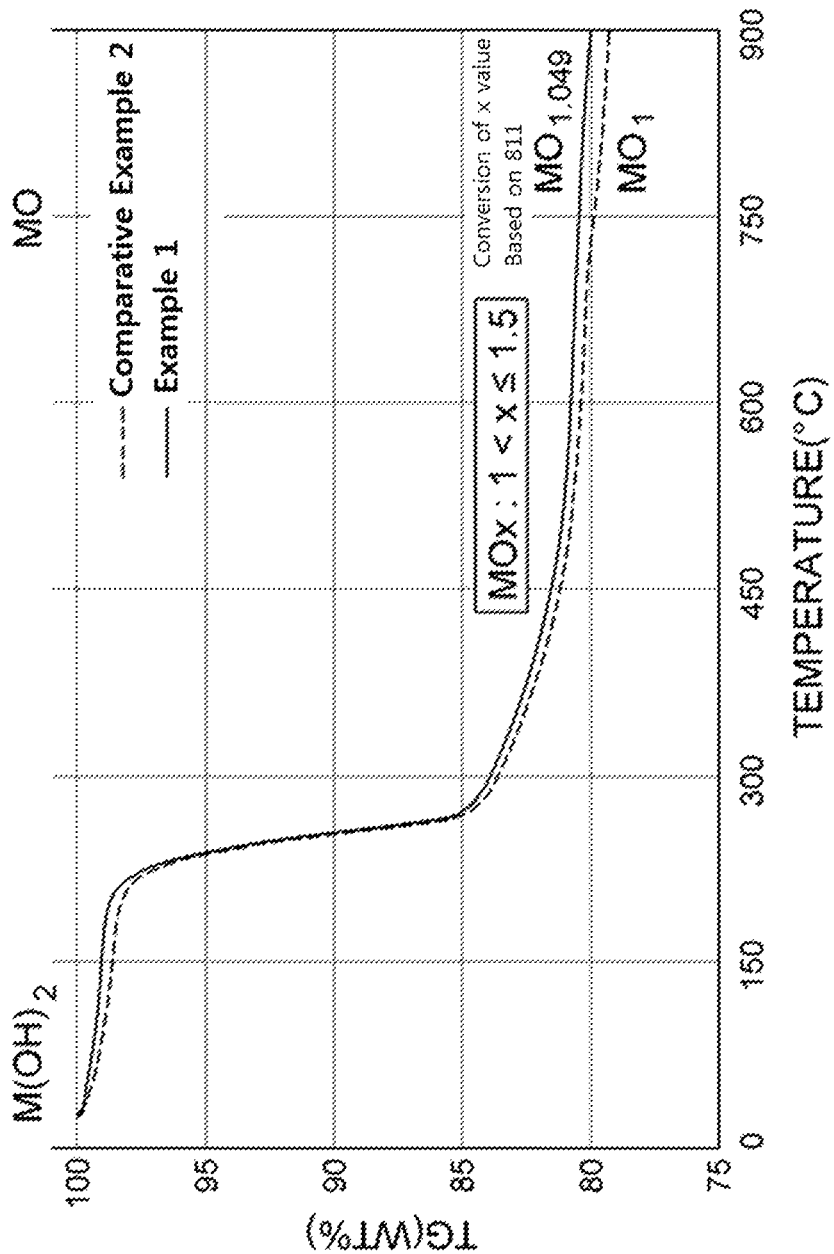
FIG. 1 is a graph showing thermogravimetric analysis (TGA) results of the cathode active material precursors prepared in Example 1 and Comparative Example 2.

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, the present disclosure will be described in detail.

Cathode active materials for a lithium secondary battery in the related art are generally prepared via a solid phase reaction of a hydroxide-based composite transition metal precursor ($M(OH)_2$) with a lithium precursor. In this case, an excessive amount of water ($5H_2O$) is produced as a byproduct of the final reaction, and the production yield itself is relatively low (see the following Reaction Formula 2).

Thus, the present disclosure is characterized in that an oxide-based precursor, in which the oxygen fraction is enhanced via an oxidation treatment, is prepared instead of directly using the hydroxide-based precursor, and the oxide-based precursor is used as a material for a cathode active material precursor.

That is, in the present disclosure, a hydroxide-based composite transition metal precursor ($M(OH)_2$) is synthesized via a co-precipitation process in the related art, and an oxidation treatment process in a broad sense, in which the synthesized hydroxide-based precursor is subjected to heat treatment under an oxygen atmosphere and/or an oxidizing agent is used, is performed. Since the oxide prepared via the oxidation process is in the form of a composite transition metal oxide (MO, 1<x<1.5) having a high oxygen fraction (molar ratio) compared to transition metals and thus has a high reaction yield, the productivity of the cathode active material may be enhanced, and particularly, a high-Ni-based cathode active material having a high nickel content may be easily synthesized (see the following Reaction Formula 1).

$$2LiOH \rightarrow Li_2O + H_2O(g)$$

$$M(OH)_2 \rightarrow MO + H_2O(g)$$

$$:Li_2O + 2MO + \tfrac{1}{2}O_2(g) \rightarrow 2LiMO_2 \quad \text{[Reaction Formula 1]}$$

More specifically, when the ordinary synthesis reaction of a cathode active material represented by [Reaction Formula 1] is reviewed, a cathode active material is synthesized via a sintering process at high temperature over a long period of time because 0.5 M of oxygen is insufficient. However, when a high-Ni-based cathode active material having a high Ni content is sintered at high temperature over a long period of time, there occurs the cation mixing in which Ni is positioned in a lithium layer in the layered crystal structure while the content of $Ni^{2+}$ ions is increased during the sintering process, so that it is difficult to perform sintering at high temperature over a long period of time. Therefore, when the Ni content is increased, the cathode active material is usually synthesized under an oxygen atmosphere.

In the present disclosure, the cathode active material is synthesized under the oxygen atmosphere, and a transition metal precursor having a high inherent oxygen content is used. Accordingly, the molar ratio of the transition metal to lithium is optimized by supplementing oxygen, which is insufficient in the entire synthesis reaction of the cathode active material, inside the precursor itself, so that it is possible to easily synthesize a cathode active material in which the initial discharge capacity is enhanced and the lifespan characteristics are excellent, and preferably a high-Ni-based cathode active material.

When a cathode active material is synthesized using the oxide-based precursor, the production yield is approximately 83% as in the following [Reaction Formula 3], so that it is possible to exhibit an effect of improving the productivity by about 10% compared to the production yield of a hydroxide-based precursor in the related art, and an effect of reducing the amount of byproduct water produced (3H$_2$O).

$2M(OH)_2 + 2LiOH \cdot H_2O + \frac{1}{2}O_2(g) \rightarrow 2LiMO_2 + 5H_2O(g)$: (production yield of LiMO$_2$: 71.9%) [Reaction Formula 2]

$2MO_x + 2LiOH \cdot H_2O + \frac{1}{2}O_2(g) \rightarrow 2LiMO_2 + 3H_2O(g)$: (production yield of LiMO$_2$: 82.9%, $1 < x \leq 1.5$) [Reaction Formula 3]

In the present disclosure, storage and handling ease may be secured by using an oxide-based precursor which is physically more stable than a hydroxide-based precursor in the related art. In addition, it is possible to enhance charge and discharge capacity and lifespan characteristics of a battery compared to a control using a hydroxide-based precursor in the related art or an oxide-based precursor having a relatively low oxygen fraction by partially supplementing insufficient oxygen during the synthesis of the cathode active material with an oxide-based precursor having a high oxygen fraction compared to the transition metal of the present disclosure (see the following FIGS. 3 and 4). Furthermore, the present disclosure has an advantage in that it is possible to provide a cathode active material for a secondary battery, which is relatively inexpensive according to the high production yield.

<Composite Transition Metal Oxide-Based Precursor and Preparing Method Thereof>

The composite transition metal oxide-based precursor according to the present disclosure may be a compound represented by the following Chemical Formula 1.

$MO_x (1 < x < 1.5)$ [Chemical Formula 1]

In the formula,

M is $Ni_a Co_b M'_c$,

M' is one or more selected from the group consisting of a typical alkali metal, an alkaline earth metal, a Group XIII element, a Group XIV element, a Group XV element, a Group XVI element, a Group XVII element, a transition metal, and a rare earth element, which are known in the art, and $0.6 \leq a < 1.0$, $0 \leq b \leq 0.4$, $0 \leq c \leq 0.4$, $a+b+c=1$.

In Chemical Formula 1, a, b, and c denote a mol % of each element in the compound, and x denotes an oxygen fraction in the compound.

In particular, in the composite transition metal oxide-based precursor of the present disclosure, the content of nickel (Ni), which is a, may be 0.6 or more, preferably in a range of 0.6 to 0.99, and more preferably in a range of 0.7 to 0.9. Further, the oxygen fraction, which is x, is higher than 1, and preferably more than 1 and 1.5 or less. When the above-described ranges of a and x are satisfied, together with an effect of enhancing the productivity during the synthesis of the cathode active material, a high-Ni-based cathode active material may be easily prepared, and excellent electrochemical properties (high initial capacity and long lifespan characteristics) of the prepared cathode active material may be shown.

In the present disclosure, even though the Ni content is increased to 60% or more, structural stability and electrochemical characteristics of a final cathode active material may be constantly maintained by substituting the high-Ni-based composite oxide with a small amount of M' such as a heterogeneous metal, a metalloid, or other anionic components.

According to a preferred embodiment of the present disclosure, M' may be one or more selected from the group consisting of Al, Mn, Zr, W, Ti, Mg, Sr, Ba, Ce, Hf, F, P, S, La, and Y.

In the present disclosure, the composite transition metal oxide-based precursor may be a primary particle or a secondary particle in which a plurality of primary particles is aggregated. In this case, the primary particle may have a flake-like or needle-like shape with an average particle diameter in a range of 0.01 to 0.8 μm, and may have a structure in which a plurality of pore structures is distributed on the surface and/or inside thereof. Further, the secondary particle in which the plurality of primary particles is aggregated may have a spherical shape in which the average particle diameter (D50) is in a range of 3 to 30 μm, but is not particularly limited thereto. In an X-ray diffraction analysis, a lattice constant of the precursor has a value of a=b=c.

In the present disclosure, the composite transition metal oxide-based precursor may have a specific surface area in a range of 5 to 80 m$^2$/g measured according to the nitrogen adsorption BET method, and the specific surface area may be preferably 5 to 50 m$^2$/g.

A plurality of micro pores and meso pores may be present on the surface and/or inside of the composite transition metal oxide-based precursor, and preferably, most of the pore structures may be composed of meso pores. Moreover, in the precursor, a volume of pores in a range of 5 nm to 50 nm may be in a range of 10$^{-3}$ to 10$^{-2}$ cm$^3$/g·nm per weight of particles, and preferably 2×10$^{-3}$ to 8×10$^{-3}$ cm$^3$/g·nm.

In the present disclosure, pores are defined as micropores having a pore diameter of less than 2 nm, mesopores having a pore diameter in a range of 2 to 50 nm, and macropores having a pore diameter of 50 nm or more according to the definition of the International Union of Pure and Applied Chemistry (IUPAC).

The composite transition metal oxide-based precursor powder may have a tap density of 2.0 g/cc or more, and more preferably 2.1 g/cc or more.

Hereinafter, a method for preparing a composite transition metal oxide-based precursor according to the present disclosure will be described. However, the method is not limited only to the following preparation method, and if necessary, a step of each process may be modified or optionally mixed and performed.

In a preferred embodiment in which the composite transition metal oxide-based precursor is prepared, an oxide-based precursor is prepared by oxidizing a composite transition metal hydroxide-based precursor.

Here, the oxidation means a broad concept in which a reactant combines with oxygen or oxygen or electron is lost from the reactant. The oxidation step may be performed in the following three forms, and for example, (i) a composite transition metal hydroxide-based precursor may be subjected to heat treatment under an oxygen atmosphere, (ii) the hydroxide-based precursor may be reacted with an oxidizing agent and be oxidized, or (iii) both (i) and (ii) may be applied.

When a first embodiment of the oxidation step is described, a composite transition metal hydroxide-based precursor is subjected to heat treatment under an oxygen atmosphere.

In this case, the composite transition metal hydroxide-based precursor is not particularly limited as long as the precursor is in the form of a hydroxide while including nickel in a high content. For example, the composite transition metal hydroxide-based precursor may be represented by the following Chemical Formula 2.

$$M(OH)_2 \quad \text{[Chemical Formula 2]}$$

In the formula,

M is $Ni_aCo_bM'_c$,

M' is one or more selected from the group consisting of an alkali metal, an alkaline earth metal, a Group XIII element, a Group XIV element, a Group XV element, a Group XVI element, a Group XVII element, a transition metal, and a rare earth element, and $0.6 \leq a < 1.0$, $0 \leq b \leq 0.4$, $0 \leq c \leq 0.4$, $a+b+c=1$.

According to a preferred embodiment of the present disclosure, M' may be one or more selected from the group consisting of Al, Mn, Zr, W, Ti, Mg, Sr, Ba, Ce, Hf, F, P, S, La, and Y.

In the oxidation step, the oxygen atmosphere is not particularly limited, and may be, for example, an air atmosphere containing oxygen at a concentration of 80% or more.

The heat treatment condition is not particularly limited, and for example, a heat treatment may be performed in a range of 200 to 1,000° C. for 1 to 12 hours, and preferably in a range of 400 to 700° C.

In a second embodiment of the oxidation step according to the present disclosure, a composite transition metal oxide-based precursor is prepared by reacting the composite transition metal hydroxide-based precursor with an oxidizing agent.

Here, as the oxidizing agent, a typical oxidizing agent known in the art may be used without limitation, and for example, it is possible to use one or more selected from the group consisting of $KMnO_4$, $H_2O_2$, $Na_2O_2$, $FeCl_3$, $CuSO_4$, $CuO$, $PbO_2$, $MnO_2$, $HNO_3$, $KNO_3$, $K_2Cr_2O_7$, $CrO_3$, $P_2O_5$, $H_2SO_4$, $K_2S_2O_8$, halogens, and $C_6H_5NO_2$.

As long as the oxidizing agent may convert the hydroxide precursor into the oxide precursor via an oxidation-reduction reaction, the amount of the oxidizing agent used is not particularly limited, and may be adjusted within a typical range known in the art.

A third embodiment of the oxidation step according to the present disclosure is that the first and second embodiments are used in combination, and for example, is that a heat treatment is performed under the above-described oxygen atmosphere using a composite transition metal hydroxide-based precursor and an oxidizing agent.

When the third embodiment is performed as described above, the hydroxide-based precursor may be converted into an oxide-based precursor having a high oxygen fraction within a short period of time.

<Cathode Active Material>

The cathode active material according to the present disclosure is a lithium composite transition metal oxide prepared from the above-described composite transition metal oxide-based precursor.

More specifically, the cathode active material may be represented by the following Chemical Formula 3.

$$Li_yNi_aCo_bM'_cO_2 \quad \text{[Chemical Formula 3]}$$

In Chemical Formula 3,

M' is one or more selected from the group consisting of an alkali metal, an alkaline earth metal, a Group XIII element, a Group XIV element, a Group XV element, a Group XVI element, a Group XVII element, a transition metal, and a rare earth element, and $0.6 \leq a < 1.0$, $0 \leq b \leq 0.4$, $0 \leq c \leq 0.4$, $a+b+c=1$, and $0.9 \leq y \leq 1.3$.

According to a preferred embodiment of the present disclosure, M' may be one or more selected from the group consisting of Al, Mn, Zr, W, Ti, Mg, Sr, Ba, Ce, Hf, F, P, S, La, and Y.

In the present disclosure, the cathode active material may be an active material of a Ni-rich system having a nickel (Ni) content of 60% or more in the overall transition metals, and the nickel (N) content may be preferably in a range of 60 to 90%, and more preferably in a range of 70 to 90%.

The average particle diameter of the cathode active material is not particularly limited as long as the particle diameter is in a typical range which may be used as an active material. The average particle diameter may be, for example, in a range of 5 to 30 μm, and preferably in a range of 5 to 20 μm.

The cathode active material of the present disclosure may be prepared by a typical method known in the art, and may be prepared by, for example, a dry method, a wet method, or a combination thereof.

As an example of the method for preparing the cathode active material, the cathode active material may be prepared via a solid phase reaction in which the composite transition metal oxide-based precursor is mixed with a lithium precursor, and then a heat treatment is performed.

Here, the lithium precursor is not particularly limited as long as the lithium precursor may be used as a supply source including lithium. The lithium precursor may be preferably $LiOH$, $Li_2CO_3$, or a mixture thereof.

The mixing ratio of the composite transition metal oxide-based precursor and the lithium precursor may be appropriately adjusted within a typical range known in the art, and may be, for example, in a range of 1:0.95 to 1.15 parts by weight.

By mixing the composite transition metal oxide-based precursor with the lithium precursor and performing a heat treatment as described above, lithium is substituted in the crystal structure, so that a lithium composite transition metal oxide is formed.

In this case, the heat treatment condition is not particularly limited, and for example, it is preferred that the heat treatment is performed under an atmospheric condition at 700 to 1,000° C. for 0.5 to 10 hours.

If necessary, a secondary heat treatment may be subsequently performed or a classification process may be further included.

The cathode active material prepared in the present disclosure is usually used as a cathode material for a secondary battery, and may be used in, for example, various fields to which the above-described configuration may be applied.

<Cathode>

The present disclosure provides the above-described cathode material for a secondary battery, and a lithium secondary battery comprising the same.

In this case, the cathode material of the present disclosure is required to at least include a cathode active material prepared from the composite transition metal oxide-based precursor. As an example, the cathode active material itself is used as a cathode active material, or a cathode composite material in which the cathode active material and a binding agent are mixed, a cathode composite material paste obtained by additionally adding a solvent to the cathode composite material, a cathode formed by additionally applying the cathode composite material paste on a current collector, and the like belong to the scope of the cathode material of the present disclosure.

The cathode may be prepared by a typical method known in the art, and may be prepared, for example, by mixing and stirring a binder, a conductive agent, and a dispersing agent, if necessary, with a cathode active material to prepare a slurry, applying (coating) the slurry on a current collector, compressing the current collector, and then drying the current collector.

In this case, as an electrode material such as a dispersion medium, a binder, a conductive agent, and a current collector, a typical electrode material known in the art may be used, and based on the amount of the cathode active material, the binder may be appropriately used in a range of 1 to 10 parts by weight, and the conductive agent may be appropriately used in a range of 1 to 30 parts by weight.

Examples of an available conductive agent include natural graphite, artificial graphite, carbon black, acetylene black series or Gulf Oil Company, Ketjen black, Vulcan XC-22, Super P, cokes, carbon nanotubes, graphenes, or one or more mixtures thereof, and the like.

Representative examples of the binding agent include polytetrafluoroethylene (PTFE), polyvinylidene fluoride (PVdF) or a copolymer thereof, styrene butadiene rubber (SBR), cellulose, and the like, and representative examples of the dispersing agent include isopropyl alcohol, N-methylpyrrolidone (NMP), acetone, and the like.

The current collector of the metal material is a metal having high conductivity, and as a metal to which the paste of the material may be easily adhered, any metal having no reactivity in the voltage range of the battery may be used. Examples thereof include mesh such as aluminum, copper or stainless steel, foil, and the like.

<Lithium Secondary Battery>

The present disclosure provides a secondary battery including the cathode, and preferably a lithium secondary battery.

The lithium secondary battery of the present disclosure is not particularly limited, except that the cathode active material prepared from the above-described composite transition metal oxide-based precursor is used, and may be prepared by a typical method known in the art. For example, the secondary battery of the present disclosure may be prepared by inserting a separator between a cathode and an anode, and introducing a non-aqueous electrolyte.

In this case, the lithium secondary battery of the present disclosure includes an anode, a cathode, a separator, and an electrolyte as battery constituent elements, and the constituent elements of the anode, the separator, the electrolyte, and other additives, if necessary, except for the cathode, correspond to the typical elements of a lithium secondary battery known in the art.

As an example, a typical anode active material for a lithium secondary battery, which is known in the art, may be used for the anode, and as a non-limiting example thereof, a material capable of intercalating/deintercalating lithium is used, and examples thereof include lithium metal or a lithium alloy, cokes, artificial graphite, natural graphite, an organic polymer compound combustion body, carbon fiber, silicon-based materials, tin-based materials, and the like. Further, the conductive agent, the binding agent, and the solvent are used in the same manner as in the case of the above-described cathode.

The non-aqueous electrolyte includes electrolyte components typically known in the art, for example, electrolyte salts and electrolyte solvents.

The electrolyte salt may be composed of a combination of (i) a cationic ion selected from the group consisting of $Li^+$, $Na^+$, and $K^+$ and (ii) an anionic ion selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, and $C(CF_2SO_2)_3^-$, and among them, a lithium salt is preferred. Specific examples of the lithium salt include $LiClO_4$, $LiCF_3SO_3$, $LiPF_6$, $LiBF_4$, $LiAsF_6$, $LiN(CF_3SO_2)_2$, and the like. These electrolyte salts may be used alone or in mixture of two or more thereof.

As the electrolyte solvent, a cyclic carbonate, a linear carbonate, lactone, ether, ester, acetonitrile, lactam, and ketone may be used.

Examples of the cyclic carbonate include ethylene carbonate (EC), propylene carbonate (PC), butylene carbonate (BC), fluoroethylene carbonate (FEC), and the like, and examples of the linear carbonate include diethyl carbonate (DEC), dimethyl carbonate (DMC), dipropyl carbonate (DPC), ethyl methyl carbonate (EMC), methyl propyl carbonate (MPC), and the like. Examples of the lactone include gamma butyrolactone (GBL), and examples of the ether include dibutyl ether, tetrahydrofuran, 2-methyl tetrahydrofuran, 1,4-dioxane, 1,2-dimethoxyethane, 1,2-diethoxyethane, and the like. Examples of the ester include methyl formate, ethyl formate, propyl formate, methyl acetate, ethyl acetate, propyl acetate, methyl propionate, ethyl propionate, butyl propionate, methyl pivalate, and the like. Further, examples of the lactam include N-methyl-2-pyrrolidone (NMP), and the like, and examples of the ketone include polymethyl vinyl ketone. In addition, halogen derivatives of the organic solvent may also be used, but the example is not limited thereto. Furthermore, as the organic solvent, glyme, diglyme, triglyme, and tetraglyme may also be used. These organic solvents may be used alone or in mixture of two or more thereof.

As the separator, a porous material, which serves to block an internal short-circuit of both electrodes and impregnate the electrolyte solution, may be used without limitation. Non-limiting examples thereof include polypropylene-based, polyethylene-based, and polyolefin-based porous separators, or a composite porous separator in which an inorganic material is added to the porous separator, and the like.

Hereinafter, the present disclosure will be described in detail through the Examples, but the following Examples and Experimental Examples only exemplify one form of the present disclosure, and the scope of the present disclosure is not limited by the following Examples and Experimental Examples.

Example 1

1-1. Preparation of Composite Cathode Active Material Precursor $Ni_{0.8}Co_{0.1}Mn_{0.1}O_{1.05}$, which is the cathode active material precursor in Example 1, was prepared by subjecting $Ni_{0.8}Co_{0.1}Mn_{0.1}(OH)_2$ to heat treatment at 550° C. under a 100% oxygen atmosphere for 3 hours.

1-2. Preparation of Cathode Active Material

A cathode active material ($LiNi_{0.8}Co_{0.1}Mn_{0.1}O_2$) in Example 1 was prepared by using the $Ni_{0.8}Co_{0.1}Mn_{0.1}O_{1.05}$ prepared in Example 1-1 and $LiOH \cdot H_2O$ to mix the $Ni_{0.8}Co_{0.1}Mn_{0.1}O_{1.05}$ and the $LiOH \cdot H_2O$ at a molar ratio of 1 to 1, and then performing a heat treatment at 800° C. for 12 hours.

1-3. Preparation of Cathode

A slurry was prepared by dispersing 95 parts by weight of the cathode active material prepared in Example 1-2, 2.5 parts by weight of a PvdF binder, and 2.5 parts by weight of carbon black as a conductive agent in an NMP solution, and then applied on an Al current collector. Thereafter, a cathode was prepared by rolling with a roll press.

1-4. Preparation of Lithium Secondary Battery

A coin cell was prepared by employing the cathode prepared in Example 1-3 and lithium metal as counter electrodes, and using an electrolyte solution composed of EC/EMC/DEC (40/30/30, volume ratio) and 1 M $LiPF_4$.

Comparative Example 1

A cathode active material of Comparative Example 1 was prepared by using $Ni_{0.8}Co_{0.1}Mn_{0.1}(OH)_2$ and $LiOH \cdot H_2O$ as a hydroxide-based precursor and a lithium precursor, respectively, to mix the $Ni_{0.8}Co_{0.1}Mn_{0.1}(OH)_2$ and the $LiOH \cdot H_2O$ at a molar ratio of 1 to 1 without using an oxide-based precursor, and then performing a heat treatment at 800° C. for 12 hours.

A cathode and a lithium secondary battery including the same in Comparative Example 1 were prepared by performing the same method as in Example 1, except that the cathode active material was used.

Comparative Example 2

1-1. Preparation of Composite Cathode Active Material Precursor

The cathode active material precursor in Comparative Example 2 was prepared by subjecting $Ni_{0.8}Co_{0.1}Mn_{0.1}(OH)_2$ to heat treatment at 550° C. under an air atmosphere for 3 hours.

A cathode and a lithium secondary battery including the same in Comparative Example 2 were prepared by performing the same method as in Example 1, except that the cathode active material was used.

[Experimental Example 1] Thermogravimetric Analysis (TGA) of Precursor for Cathode Active Material The change in degree of oxidation of the precursor according to each atmosphere was observed by using a hydroxide-based precursor ($M(OH)_2$, M=$Ni_{0.8}Co_{0.1}Mn_{0.1}(OH)_2$]) to perform a thermogravimetric analysis (TGA) under each of an oxygen atmosphere and an air atmosphere.

In this case, when the powder was subjected to thermogravimetric analysis (TGA) under the oxygen atmosphere, the measurement was performed under a 100% oxygen atmosphere in the same manner as in Example 1. After the temperature was increased from normal temperature to 900° C. at a scan speed of 1.5° C./min under an oxygen atmosphere and an air atmosphere, the amount of decrease in weight of the cathode active material precursor was measured, and the results are illustrated in FIG. 1.

In the case of the oxide ($MO_x$, M=$Ni_{0.8}Co_{0.1}Mn_{0.1}$, (811)) in Example 1, in which the thermogravimetric analysis was performed under the oxygen atmosphere, the decrease in weight of the precursor was relatively smaller than Comparative Example 2, in which the thermogravimetric analysis was performed under the air atmosphere. Further, as a result of converting the x value in $MO_x$, which is a sample in Example 1 and Comparative Example 2, it could be seen that in the cathode active material precursor in Example 1, the x value exceeded 1 and the oxygen fraction was high (see FIG. 1).

[Experimental Example 2] Evaluation of Specific Surface Area (BET) and Porous Distribution of Precursor for Cathode Active Material Each of the precursors prepared in Example 1 and Comparative Examples 1 to 2 was used to confirm the specific surface area and porous distribution of the precursors.

Figure 2:
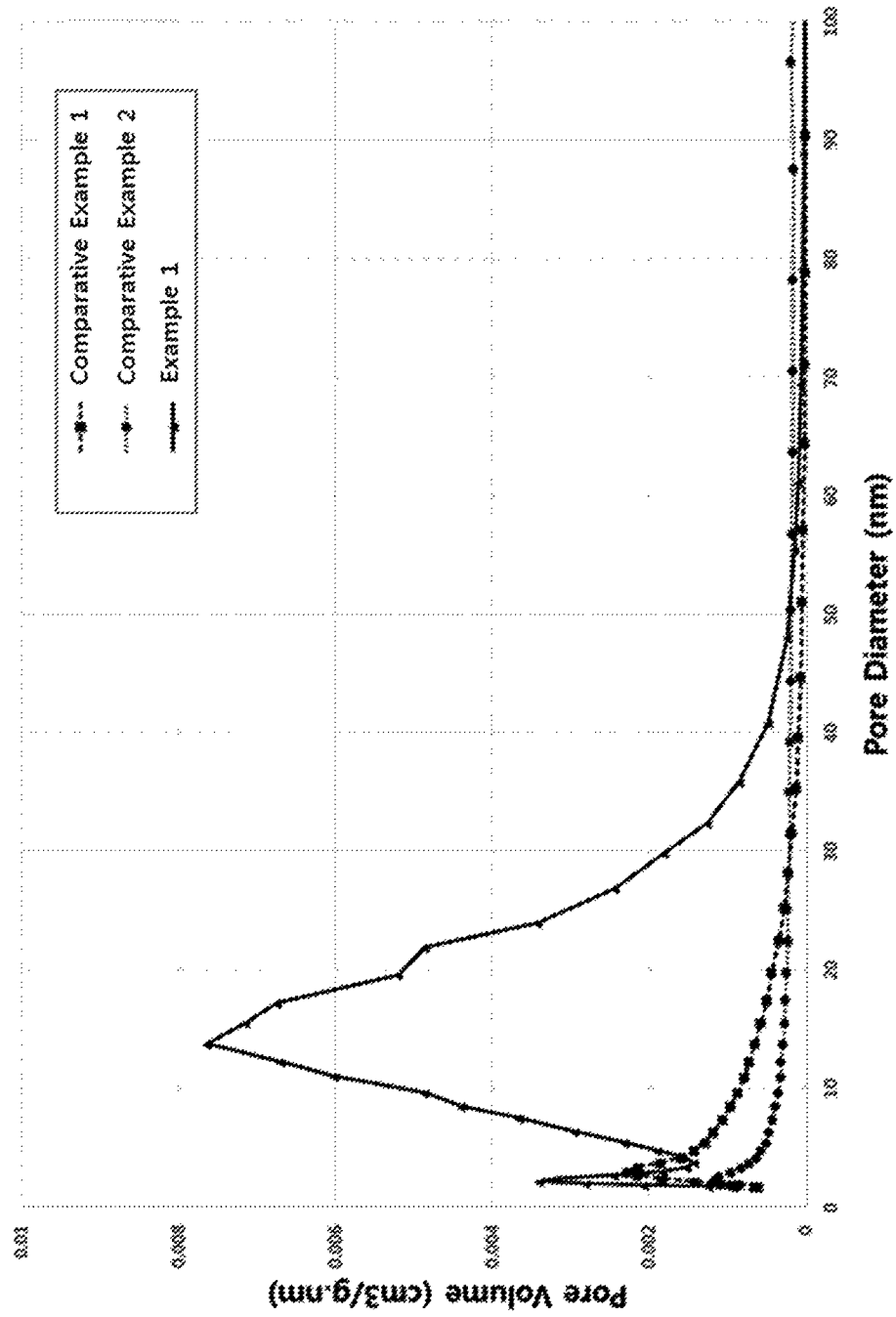
FIG. 2 is a graph showing the pore distribution of the cathode active material precursors prepared in Example 1 and Comparative Examples 1 and 2.

In this case, the specific surface area was measured under the nitrogen atmosphere at 0.01 to 0.2 atm after 3 g of the cathode active material precursor was used to perform a pre-treatment at 130° C. for 3 hours. The measured specific surface area and porous distribution were shown in the following Table 1 and FIG. 2.

TABLE 1

|  | Specific surface area ($m^2/g$) |
| --- | --- |
| Comparative Example 1 | 12.16 |
| Comparative Example 2 | 9.58 |
| Example 1 | 41.02 |

As a result of the experiment, it was confirmed that the precursor in Comparative Example 1 in the form of a hydroxide in the related art; and the MO-type oxide-based precursor in Comparative Example 2, in which a transition metal: oxygen were present at a ratio of 1:1, had a small specific surface area value, and micropores having a size of less than 5 nm and mesopores were present in small amounts on the surfaces of the precursors.

In contrast, it could be confirmed that for the cathode active material precursor in Example 1, the pores size, the pore volume, and the specific surface area had been remarkably increased by 3 times or more compared to those in the cathode active material precursors in Comparative Examples 1 and 2. It could be seen that the increases in specific surface area and surface micropores enhance the reactivity in the solid phase reaction of lithium with the precursor, and are a factor which may enhance the discharge capacity and lifespan characteristics of the cathode active material.

[Experimental Example 3] Evaluation of Electrochemical Properties of Secondary Battery (1)—Evaluation of Initial Discharge Capacity The electrochemical properties were evaluated by using the lithium secondary batteries including the cathode active materials prepared in Example 1 and Comparative Examples 1 and 2.

In this case, in the evaluation of electrochemical properties, the initial discharge capacity was measured by performing charge and discharge tests one time at 0.2 C CC/CV mode in a voltage region of 3.0 V to 4.25 V.

TABLE 2

|  | 0.2C discharge capacity @ $1^{ST}$ Cycle (mAh/g) |
| --- | --- |
| Comparative Example 1 | 202.6 |
| Comparative Example 2 | 203.7 |
| Example 1 | 208.5 |

Figure 3:
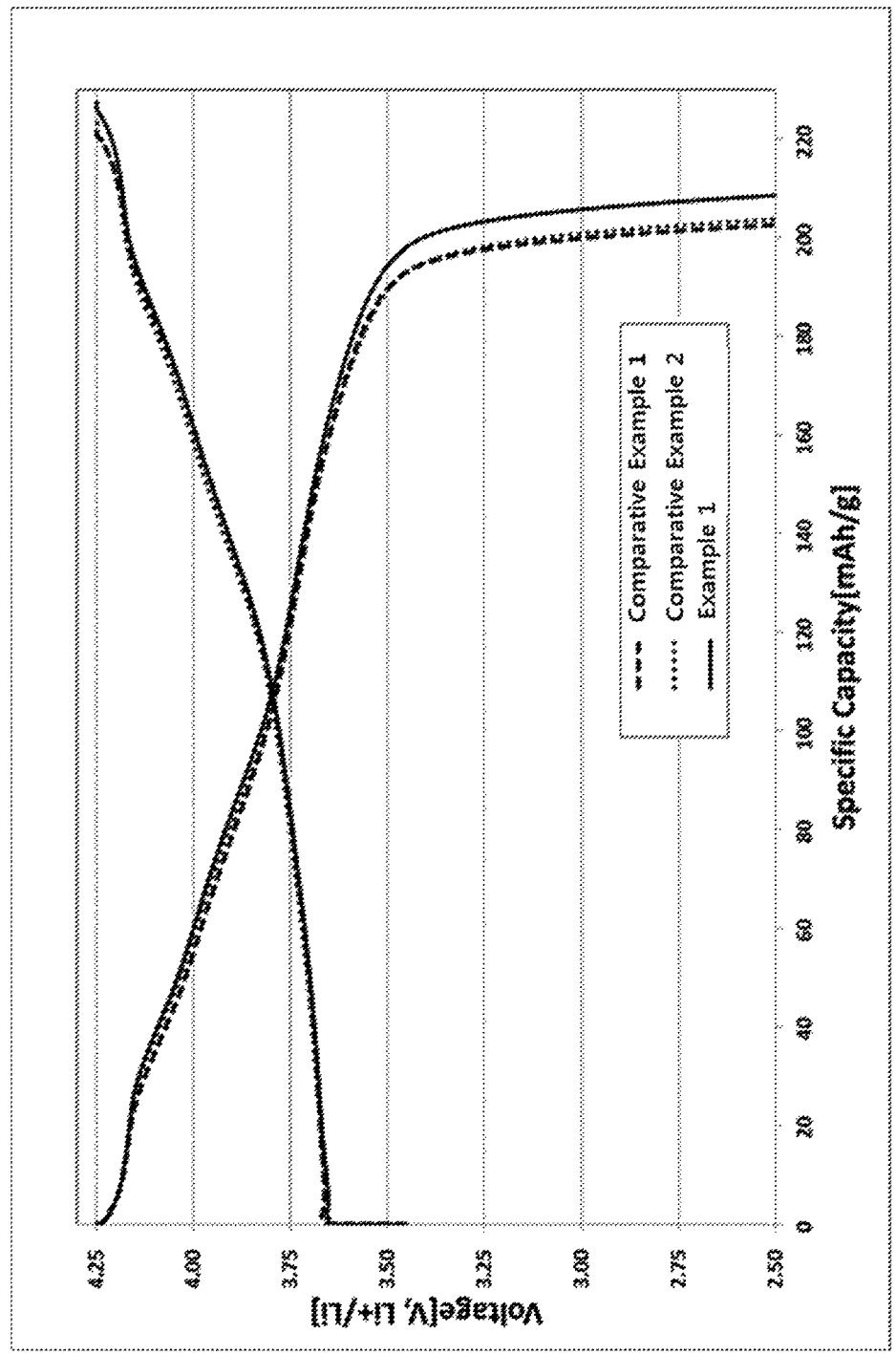
FIG. 3 is a graph showing the initial discharge capacity characteristics of lithium secondary batteries including the cathode active materials prepared in Example 1 and Comparative Examples 1 and 2.

As can be seen in Table 2 and FIG. 3, it could be seen that for the batteries in Example 1 and Comparative Example 2 including the cathode prepared using an oxide-based cathode active material precursor, the initial discharge capacity had been remarkably enhanced compared to that of the battery in Comparative Example 1 including the cathode prepared using a hydroxide-based cathode active material precursor.

In particular, when the oxygen fractions in the precursors are different from each other even though the oxide-based cathode active material precursor is equally used, the capacity characteristics of the battery including the same are differently exhibited. Specifically, it could be seen that for the battery in Example 1 including the cathode prepared from an oxide-based cathode active material precursor ($MO_x$, $1<x\leq1.5$) having a higher oxygen fraction than a transition metal, the initial discharge capacity had been significantly enhanced compared to the battery in Comparative Example 2 including a cathode prepared from an MO precursor in which the transition metal and oxygen were present at a ratio of 1:1 (see Table 2 and FIG. 3).

[Experimental Example 4] Evaluation of Electrochemical Properties of Secondary Battery (2)—Evaluation of Lifespan Characteristics The electrochemical properties were evaluated by using the lithium secondary batteries each prepared in Example 1 and Comparative Examples 1 and 2.

In this case, as the evaluation of electrochemical properties, the retention rate compared to the initial capacity was measured by performing the charge and discharge test 100 times at a cycle of 1C/1C in a voltage region of 3.0 V to 4.4 V.

As a result of the experiment, it could be seen that the batteries in Example 1 and Comparative Example 2 including a cathode prepared using an oxide-based cathode active material precursor had excellent lifespan characteristics compared to the battery in Comparative Example 1 including a cathode prepared using a hydroxide-based cathode active material precursor.

As in the above-described evaluation of the initial capacity of battery, when the oxygen fractions in the precursors are different from each other even though the oxide-based cathode active material precursor is equally used, the lifespan characteristics of the battery including the same are differently exhibited.

Figure 4:
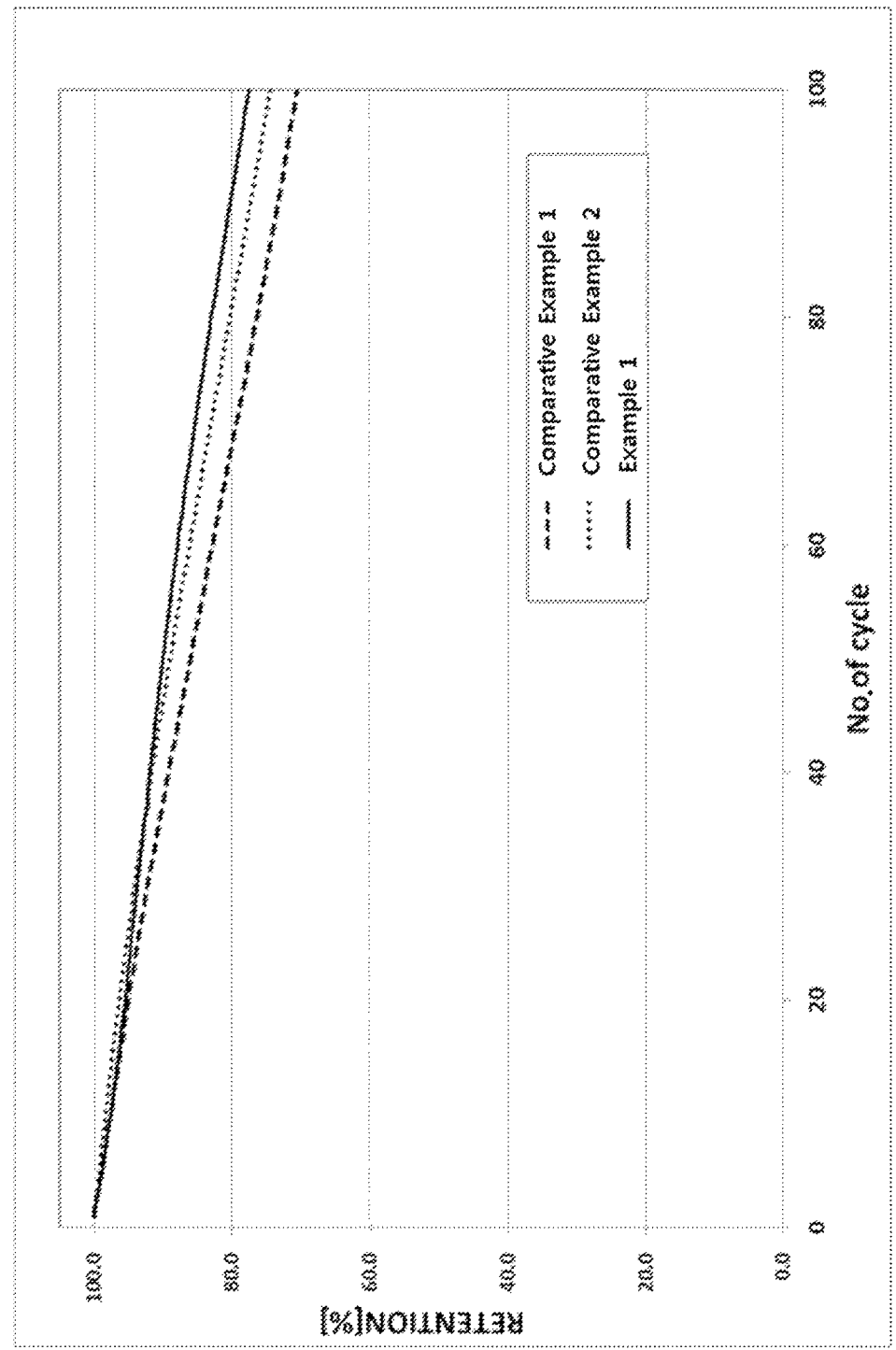
FIG. 4 is a graph showing the lifespan characteristics of lithium secondary batteries including the cathode active materials prepared in Example 1 and Comparative Examples 1 and 2.

Specifically, it could be seen that for the battery in Example 1 including the cathode prepared from an oxide-based cathode active material precursor ($MO_x$, $1<x\leq1.5$) having a higher oxygen fraction than a transition metal, the lifespan characteristics had been enhanced compared to the battery in Comparative Example 2 including a cathode prepared from an MO precursor in which the transition metal and oxygen were present at a ratio of 1:1 (see FIG. 4).

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A composite transition metal oxide-based precursor represented by the following Chemical Formula 1:

$Ni_aCo_bM'_cO_x$ ($1<x\leq1.5$)     [Chemical Formula 1]

in the formula,
M' is one or more selected from the group consisting of an alkali metal, an alkaline earth metal, a Group XIII element, a Group XIV element, a Group XV element, a Group XVI element, a Group XVII element, a transition metal, and a rare earth element, and $0.6\leq a<1.0$, $0\leq b\leq0.4$, $0\leq c\leq0.4$, $a+b+c=1$.

2. The composite transition metal oxide-based precursor of claim 1, wherein M' is one or more selected from the group consisting of Al, Mn, Zr, W, Ti, Mg, Sr, Ba, Ce, Hf, F, P, S, La, and Y.

3. The composite transition metal oxide-based precursor of claim 1, wherein the precursor is a primary particle or a secondary particle in which a plurality of primary particles is aggregated.

4. The composite transition metal oxide-based precursor of claim 3, wherein the primary particle has a flake-like or needle-like shape with an average particle diameter in a range of 0.01 to 0.8 μm, and a plurality of pore structures is present on the surface or inside thereof, and the secondary particle has an average particle diameter (D50) in a range of 3 to 30 μm.

5. The composite transition metal oxide-based precursor of claim 1, wherein the precursor has a tap density of 2.0 g/cc or more.

6. The composite transition metal oxide-based precursor of claim 1, wherein the precursor has a specific surface area in a range of 5 to 80 m²/g measured according to the nitrogen adsorption BET method.

7. The composite transition metal oxide-based precursor of claim 1, wherein in the precursor, a volume of pores in a range of 5 nm to 50 nm is in a range of $10^{-3}$ to $10^{-2}$ cm³/g·nm per weight of particles.

8. A method for preparing the composite transition metal oxide-based precursor of claim 1, the method comprising a step of oxidizing a composite transition metal hydroxide-based precursor represented by the following Chemical Formula 2:

$Ni_aCo_bM'_c(OH)_2$     [Chemical Formula 2]

in the formula,
M' is one or more selected from the group consisting of an alkali metal, an alkaline earth metal, a Group XIII element, a Group XIV element, a Group XV element, a Group XVI element, a Group XVII element, a transition metal, and a rare earth element, and $0.6\leq a<1.0$, $0\leq b\leq0.4$, $0\leq c\leq0.4$, $a+b+c=1$.

9. The method of claim 8, wherein in the step of oxidizing,
(i) a heat treatment is performed under an oxygen atmosphere,
(ii) an oxidizing agent is used, or
(iii) both (i) and (ii) are applied.

10. The method of claim 8, wherein in the oxidizing, a heat treatment is performed in a range of 200 to 1,000° C. under an oxygen atmosphere at an oxygen concentration of 80% or more for 1 to 12 hours.

11. The method of claim 9, wherein the oxidizing agent is one or more selected from the group consisting of $KMnO_4$, $H_2O_2$, $Na_2O_2$, $FeCl_3$, $CuSO_4$, $CuO$, $PbO_2$, $MnO_2$, $HNO_3$, $KNO_3$, $K_2Cr_2O_7$, $CrO_3$, $P_2O_5$, $H_2SO_4$, $K_2S_2O_8$, a halogen, and $C_6H_5NO_2$.

* * * * *